3,102,821
FIRE RETARDANT COMPOSITION AND METHOD
Ray E. Ellis, 170 N. Halstead St., Pasadena, Calif.
No Drawing. Filed Nov. 18, 1960, Ser. No. 70,110
18 Claims. (Cl. 106—15)

This invention relates to a fire-retardant and potentially heat-insulating composition and has for its object the provision of an improved composition of this character. This invention also relates to methods for improving the fire and heat resistance of various materials, particularly including such materials as wood, wall board, acoustical tile, and various fibrous structural units, as well as metal structural components such as iron or steel beams, sheet metal units and the like.

The invention further comprises modifications to the said fire-retardant and potentially heat-insulating composition, and alternatives to or variations in the method of utilizing the same.

More specifically, this invention particularly relates to potentially intumescing, fire-retardant compositions and methods for using the same by coating or impregnation techniques on or with combustible or heat-deformable substrates, to protect such substrates from fire or heat, and also for coating a wide variety of substrates to prevent flame propagation.

By the property of intumescing there is meant the property of foaming or similar activity of the compositions upon exposure to elevated temperatures, as the result, dominantly, of thermal decomposition, in such a manner that a porous, crusty, solid film or residue is produced. If such a porous, crusty film or residue is sufficiently continuous and adherent to the combustible or heat-deformable substrate material coated therewith, such substrate material is effectively protected against access of air as well as somewhat thermally insulated from surounding heat sources such as a fire. The result thereof is that the combustion of the flammable substrate material is either completely suppressed, for lack of oxygen, or at least greatly diminished. Moreover, due to the heat-insulating characteristics of the foamed coating, the heat-induced distillation of combustible gaseous or vaporous products, such as are characteristically formed from wood and wood products, is materially diminished, thereby preventing propagation of the flame, and resulting in many cases in the ultimate extinction of the fire for lack of suitable flammable materials of sufficiently low flash point.

Flame-proofing or fire-retardant compositions previously known have included phosphoric acid, or a salt thereof such as ammonium phosphate, or organic derivatives thereof such as alkyl ammonium phosphate salts. Such compounds have particularly frequently been used for flame-proofing of textile materials, their use with wood being objectionable because of their corrosive nature and after-glow properties.

Other known flame retarding compositions have included a solution of dicyandiamide with phosphoric acid which is heat-cured to form guanylurea phosphate and is used by impregnating wood with the solution by soaking, vacuum or pressure techniques.

In addition, flame-proofing or fire-retardant intumescing coating and/or impregnating compositions have been known in the prior art and have been used for many applications. Characteristically, such compositions have included an organic resin, of one form or another, possibly a non-resinous carbonific component, and a heat-unstable third ingredient which acts to induce the frothing of the resinous component.

Moreover, prior fire-retardant compositions containing a resinous material, such as an amino-aldehyde condensation product have also included as a component thereof with a reaction product of phosphorous pentoxide and ammonia, or a reaction product of ammonia and phosphorus oxychloride. It is stated that in such compositions the phosphorous pentoxide-ammonium component may serve as a fire-retardant or fire-resistant material, although it will not actually intumesce in the absence of the other resinous ingredient when exposed to an open flame. Intumescence is observed only when such components are admixed with a resin-condensation product, and the resulting composition is then exposed to heat.

Thus, such prior compositions have relied on the specific interaction of the phosphorous-ammonia complex with the resinuous component of the composition to achieve an effective fire-retardant coating.

Generally in the field of such fire-retardant compositions, wherein an intumescing property is relied upon, the resinous component is a formaldehyde condensation product of one form or another. Consequently, the manufacture of such fire-retardant compositions has frequently required the use of formaldehyde, or paraformaldehyde, or like compound, or one of the lower aldehydes such as acetadehyde.

It is an object of the present invention to provide a highly effective intumescing fire-retardant composition based on the combination of dicyandiamide and a particular phosphorous pentoxide-ammonium reaction product, more fully described hereinafter, as the only essential active components.

This invention further provides the aforesaid composition in various modified embodiments, including additional ingredients such as pigments, wetting agents, thickening agents, etc.

A further object of this invention is to provide methods for treating heat-combustible or heat-deformable materials to protect the same with the aforesaid composition.

Other objects of this invention will become apparent from the following description thereof.

The flame-proofing and fire-retardant intumescing composition of the present invention is composed of two essential components. The first of these is the chemical compound dicyandiamide, and the second is a known water softening composition described and claimed in United States Patent 2,122,122 and sold by the assignee thereof under the trademark Victamide.

This latter component is a substantially neutral composition consisting of a nitrogen-phosphorus complex, resulting from heating a reaction product of phosphorus pentoxide and anhydrous ammonia at a temperature of at least about 150° C. in the presence of excess anhydrous ammonia to produce a condensation reaction in which ammonia is lost by the heated product, this compound having an atomic ratio of nitrogen:phosphorus of less than 1½:1 and typically containing no water of constitution. In physical characteristics, it is a substantially non-hygroscopic, substantially free-flowing powder soluble in water giving, for a 0.25% solution, a pH value of between 6 and 7. It contains both ammonium and nuclear nitrogen, with the ammonium nitrogen generally representing at least 60% and up to about 80% of the total nitrogen. Hereinafter it is referred to as the "nitrogen-phosphorus complex."

By the term nuclear nitrogen it is meant nitrogen which is incapable of being liberated with caustic solution in the manner of true ammonium nitrogen. The precise chemical structure of this nitrogen-phosphorus complex is not known, but the foregoing description, and its method of manufacture, fully and completely identifies the same to those skilled in the chemical arts.

According to the present invention, merely mixing these two components together, that is dicyandiamide and the nitrogen-phosphorus complex, in a suitable vehicle for the same, preferably water, forms a composition which may be applied as a coating without further treatment to articles made of wood, cellulose, fibreboard, and the like, or to structural metal members, and the like, to effect flame-proofing and fire-retardant protection.

Thus, after the article to be protected is brush or dip coated with the aqueous solution of these two components, and allowed to dry at normal room temperatures, i.e., from about 15 to 35° C., the deposited film has the desired property of intumescing if the article is then exposed to high temperatures such as by contact with a flame. That is, upon such exposure to a flame the coating will undergo a chemical reaction with chemical decomposition, foaming and frothing taking place to form a porous, but solid, crusty protective coating entirely covering the coated surface of the substrate article. Such a porous crust acts to prevent access of oxygen to the substrate article, and further affords heat insulation thereto. At the same time, escape of any combustible distillation products is prevented so that protection is afforded against propagation of the fire as well as against burning and/or heat-deformation of the substrate.

Various formulations of the aqueous solution containing these two components as the essential compositions of this invention are possible. For instance, the ratio of the amount of the nitrogen-phosphorus complex to the amount of the dicyandiamide employed may vary, by weight, within the range of from about 10:1 to 1:2, the best compositions generally falling within the range of from about 3:1 to 1.25:1. At the present time the most preferred ratio is 1.5:1.

The aqueous solution may contain from about 15 up to about 50 parts by weight of the nitrogen-phosphorus complex per about 100 parts of water, there being a proportionate amount of dicyandiamide present in the above-stated ratios. The most suitable compositions are those containing from about 25 to 35 parts by weight of the nitrogen-phosphorus complex per 100 parts of water, and the presently preferred concentration is about 28 parts by weight of the complex per 100 parts by weight of water, particularly when the above-mentioned, most preferred ratio of the complex to dicyandiamide is employed.

These compositions may be made up merely by mixing the desired amounts of the ingredients in the desired amount of water. The non-crystalline nitrogen-phosphorus complex is soluble and entirely dissolved in hot water over the concentration range employed for the invention, and remains in such solution even under moderate cooling thereof.

Dicyandiamide is also readily soluble on warming if available in a small particle or powder form. It is commercially available in that form and also in a coarse granular state. With the latter it is preferred that the composition be formulated on a high-speed mixer so that particle size is reduced. Complete dissolution of the dicyandiamide in the cold will not occur, but in the high speed mixer the particles thereof will be ground into minute size and well-dispersed throughout the solution.

It is preferred to add a small amount of a conventional thickening agent, such as alginate, to the solution of the nitrogen-phosphorus complex after it is dissolved in hot water, so that the thickening agent will also be fully dissolved prior to cooling and adding the dicyandiamide. Addition of dicyandiamide to the hot solution is not preferred since on cooling large inch to two-inch crystals are formed and are only inconveniently redispersed as small particles in suspension.

The amount of thickening agent to be employed will, of course, vary with the relative amounts of the nitrogen-phosphorus complex of the dicyandiamide and the concentration thereof in the solution. Generally, it is found that within the scope of the practice of this invention from about ½ to about 5 parts by weight of the alginate may be used. Preferably the amount is from about 1 to 2.5 parts and the presently most preferred amount, particularly when used with the above-described most preferred composition, is about 1⅓ parts by weight with respect to 100 parts of water for the solution.

It will be understood, of course, that in actual use of the composition the amount of thickening agent employed will also be selected in accordance with the ultimate desired thickness of the coating. Even more alginate may be used if an extremely thick coat is desired and may even be as much as 8 to 10 parts per 100 parts of water.

This invention is not limited to the use of any specific alginate as the thickening agent, and other compatible thickening agents may also be used. Such materials may be added in about the same amounts as mentioned above for the alginate.

Once the aqueous solution is formulated in the above-described manner, it is stable under ordinary storage conditions for an indefinite period of time. No chemical reaction takes place during this formulation, the components of the composition being present in their original form as added, although some settling can be expected, merely requiring stirring just prior to use as with many paints.

Accordingly, it will also be appreciated that the formulation and use of the composition of this invention does not involve high temperature curing procedures for causing some necessary chemical reaction before the potentially intumescing characteristic is developed in the protective coating. This also means that it may be applied to existing structures and buildings which could not be subjected to any subsequent heat curing treatment.

The composition just described will provide an almost clear coating when applied to the substrate to be protected. For instance, when used on wood only a very slightly graying effect is observed.

On the other hand, if a colored coating is desired, this may be readily provided by incorporating any one of the many different types of conventional paint pigments into the composition. For instance, if a white coating is desired, a titanium dioxide pigment provides excellent results when incorporated into the above-described composition and the titanium dioxide-pigmented composition is particularly well adapted for protectively coating such substrates as acoustical tile. In addition, many conventional buildings which usually require a fire coating treatment are desirably painted white, such as on wood factory buildings and lumber yard structures.

Other suitable and compatible pigments may also be used, including magnesium silicate, red $Fe_2O_3$, yellow hydrated $Fe_2O_3$, black $Fe_2O_3$; as well as organic pigments such as Lithol red, Hansa yellow and the like.

The composition provided by this invention may also be modified to provide relatively softer coating, if desired, by adding a small amount of glycerine. For instance, from 1 to 4 parts of glycerine may be added, preferably from about 2 to 3 parts of glycerine per about 100 parts of water.

Moreover, if particularly difficultly wettable surfaces are to be treated, it is well to add a wetting agent, or surface active agent, to the composition. The conventional commercial anionic wetting agents have been found to be particularly compatible with the aqueous formulations of this invention and are preferred for such use. Such agents include sodium N-octyl sulphate, isopropyl-naphthalene sodium sulfonate, and similar compatible materials. Actually, however, it is a feature of the composition of this invention that the nitrogen-phosphorus complex has very good adhering qualities, and the solution readily coats and adheres to substrate materials requiring protection, particularly wood and light cellulosic or fibrous products.

If desired, of course, compatible fungicides and/or bactericides may also be incorporated in the composition.

Those skilled in the art will understand that the other variations and modifications in this invention are also possible utilizing typical conventional additives generally used for coating in coating compositions.

Moreover, this invention is not limited to aqueous formulations. It is equally within the scope thereof to employ the composition of the nitrogen-phosphorus complex in the dicyandiamide, in the above-stated ratios and concentrations, in admixture with solvent-based flame retardant plastic resins such as chlorinated rubber or polyvinyl chloride materials. The dry powder mixture of the nitrogen-phosphorus complex and dicyandiamide may be added to the plastic resin, and the resultant mixture is dispersed in the solvent base or paint vehicle, such as a drying oil paint vehicle, a suitable thickening agent added, and the product may then be used to coat wood, metal, and like materials. Again, such a composition may contain pigmenting agents if color is desired.

Further, this invention is not limited to protecting the substrate materials merely by applying surface coatings thereto. The essential composition of the invention may equally well be used with an impregnation technique with a number of inflammable cellulose items. For instance, lumber may be soaked in a hot aqueous solution of nitrogen-phosphorus complex in combination with dicyandiamide, in the proportions and concentrations mentioned hereinabove, and thereafter dried. If a flame is then applied to the treated article, the protective carbonaceous foam coating is developed. The preferred method of impregnating lumber is using a hot solution and conducting the treatment in a retort or autoclave while applying pressure in excess of atmospheric so that the solution is forced directly into the pores of the wood. Superior flame proofing protection is achieved in this manner.

It will also be understood, of course, that the practice of this invention is not limited to the use of only one coating of the substrate material. Quite to the contrary, two or more coatings may be applied. The more coats applied, the thicker the crust develops during the intumescing, and greater protection is achieved.

It is a particular feature of this invention that when acoustical tile or like-perforated items are protected by a coating of this composition, the coating will effectively intumesce and form a porous crust bridging over and across the perforations or holes, and prevent ignition of the fibers within such openings. Thus, suitably full and deep protection of such highly flammable fibrous material is desirably achieved with this invention.

It will already have been noted that the composition of this invention is formulated in aqueous solution without any disadvantageous exothermic reaction, a recognized difficulty experienced with some previous fire resistant coatings employing dicyandiamide with a formaldehyde resin composition. This is a feature which greatly facilitates the formation and use of the composition provided by the present invention.

It will also already have been noted that the formulation of this composition is further facilitated by the use of the water-soluble nitrogen-phosphorus complex and this is in contrast to some previous fire retardant composition which were based on the employment of an amino aldehyde condensation product and also using as a component thereof a water-insoluble phosphorus pentoxide-ammonium reaction product. In such compositions in contrast to the present invention, the nitrogen:phosphorus ratio was above 2:1 instead of being less than 1.5:1. This is also in contrast to other previous fire-retardant compositions composed of aldehyde resins and polyphosphorylamide polymers, made by reaction of ammonia with phosphorus oxychloride, and which are insoluble in water and organic solvents and have nitrogen-phosphorus ratios above 1.5:1.

It is further pointed out that, as the above description indicates, the composition of this invention is fully composed when the ingredients are mixed together, as described. No further treatment thereof is necessary. Thus, at that state, the composition need only be suitably placed in containers and it is then ready for storage, shipment, sale, etc. Thus, the composition is fully composed when stored, and when used no further mixing of two separately packaged solutions or components is necessary. Moreover, no heat or other treatments are required.

As a further feature of this invention, already indicated above, the composition may be used as a protective coating on structural metal members in buildings. As is well known, in the event of a serious fire even a building having a steel girder framework, and steel rafters, will collapse under the intense heat. This is due, of course, to the heating and consequent weakening of the metal girders themselves. If such girders are coated with the composition of this invention, the foamed crusty protective layer will have formed long before the girders reach a red hot temperature, and attaining such a temperature in the metal framing member itself will be greatly prolonged because of the insulating characteristics of the porous carbonaceous layer.

This invention can clearly take the form of numerous specific embodiments, and is not specifically limited to a mixture of any particular amount of the specified components. It is, however, further illustrated by the following examples.

*Example 1*

25 pounds of hot water were placed in a vessel of suitable size equipped with a high-speed mixer device. To this was added 7½ pounds of the above-described Victamide product, made in accordance with United States Patent 2,122,122, as mentioned hereinabove. This mix was then agitated until complete solution had occurred.

Agitation was continued and ⅝ pound of alginate was added and the mix stirred to the viscous solution point. After cooling to room temperature, five pounds of commercial dicyandiamide were added. This commercial product was fairly coarse granules of the material, but after agitation for some 35 minutes, the particles had been ground to minute size, had partially dissolved, and were otherwise well dispersed through the solution under agitation.

*Example 2*

The procedure of Example 1 was followed, except that at the time of addition of the alginate thickening agent, ¾ pound of glycerine was added. It was found that this composition provided a somewhat softer, more flexible, coating.

*Example 3*

The general procedure of Example 1 was followed, except that only 2 pounds of dicyandiamide were used. This composition again provided a suitable protective coating, and, when exposed to flame temperatures, intumesced to provide a crusty porous carbonaceous layer.

*Example 4*

The procedure of Example 1 was followed, except the amount of thickening agent used was 1 pound. With this composition, a much thicker coating was possible, and comparing the resulting intumesced crusty coatings, that for the present example was also much thicker than that for Example 1. This followed because with the thicker coating a greater amount of chemicals were present per given square area unit on the coated substrate.

*Example 5*

In this example, the general procedure of Example 1 was followed, except that only 5 pounds of Victamide was employed, with 3 pounds of dicyandiamide. The thickening agent was also omitted. The resulting composition could be used to coat wood or acoustical tile material, and especially for spraying the more fibrous substrates such as fiber board and like (where the porous nature thereof will tend to absorb a considerable quantity of the composition), and after exposure thereof to high temperatures intumescing again occurred with the formation of the characteristic porous carbonaceous crust.

*Example 6*

The general procedure of Example 1 was followed using 10 pounds of Victamide and 8 pounds of dicyandiamide. The thickening agent was also, again, omitted. When this composition was brushed on an acoustical tile substrate, a still thicker crusty porous carbonaceous surface was developed after exposure to high temperatures, as compared to the preceding examples.

*Example 7*

The procedure of Example 1 was followed using the same amounts of Victamide and dicyandiamide but with the addition of 3 pounds of titanium dioxide pigment prior to the addition of the thickening agent. At the same time there was added ¼ pound of sodium N-octyl sulphate wetting agent.

This white composition was then coated on 10 acoustical tile boards, class D, and the boards were then tested in accordance with Federal specification SS–A–118b, paragraph 4.3.3, except that the flame test was conducted in a draft-free room larger than 9 by 15 feet. One brush coating was applied at the rate of ⅝ ounce of the coating composition per square foot, giving a coverage of about 249–250 square feet per gallon of composition. Prior to the flame test, the prepared panel was maintained at room temperature of 75° F.±5° F., at a relative humidity of 65%±5% for 72 hours. The results of the test are shown in the following time-temperature table, recording the observations.

| Time (minutes) | Temperature, ° F. | Observations |
|---|---|---|
| Initial | 80 | |
| 1 | 300 | |
| 2 | 450 | Intumescence in center panel. |
| 3 | 340 | Slight darkening and increased intumescence. |
| 4 | 800 | Further darkening. |
| 5 | 1,000 | Large blisters in center. |
| 6 | 1,200 | No further change. |
| 7 | 1,165 | Small lick of blue flame in center panel. |
| 8 | 1,210 | Glowing of "blisters" in center panel. |
| 9 | 1,250 | Intumescence over the whole surface. |
| 10 | 1,295 | Licks of blue flame in center. |
| 11 | 1,330 | Licks of blue flame just over edge of center panel. |
| 12 | 1,360 | No further change. |
| 13 | 1,360 | Licks of blue flame over edge of center tile. |
| 14 | 1,370 | Blue flame coming from under edge of center tile, which apparently is delaminating. |
| 15 | 1,400 | Flames approaching frame on one side. |
| 16 | 1,420 | Flames approaching frame on second side. |
| 17 | 1,425 | Large blisters developed at frame and flames receded. |
| 18 | 1,440 | Flaming receded. |
| 19 | 1,450 | Glowing of blisters in center tile; center tile white-charred material gone. |
| 20 | 1,460 | No further change. |

In this test, there was an after-flame for only 7 seconds when the test flame was extinguished, and there was no glowing after the extinguishing of the test flame. Throughout the testing the central panel remained intact, that is, no ashes or particles fell therefrom. While some smoke was given off during the test, it was not in excessive amounts; and intumescence was observed throughout the test. Flame approached the angle frame holding the acoustical tile boards 16 minutes after ignition of the test flame, but receded when intumescence of the surface increased. The flaming came from some delamination of the edge of the center tile.

As a further test of this invention, following the same Federal specification noted above, again with the exception that the flame test was conducted in a draft-free room larger than 9 by 15 feet, a second group of acoustical tile boards, class D, were treated with two coats of the composition of this last-above example. Each coat was applied at the rate of ½ ounce per square foot, giving a coverage of 160 square feet for the two coats, per gallon. A six-hour air dry period was allowed between coats, and the coated panels were again conditioned for 72 hours at the same temperature and relative humidity noted in the first test. The following table summarizes the time-temperature observations.

| Time (minutes) | Temperature, ° F. | Observations |
|---|---|---|
| Initial | 72 | |
| 1 | 300 | |
| 2 | 440 | Slight darkening. |
| 3 | 550 | Intumescence of center panel. |
| 4 | 720 | Increased intumescence. |
| 5 | 920 | Increased darkening; "blisters" large in center panel. |
| 6 | 1,150 | "Blisters" glowing in center panel. |
| 7 | 1,180 | Very small licks of blue flame in center panel. |
| 8 | 1,200 | No further change. |
| 9 | 1,260 | Intumescence over the whole surface. |
| 10 | 1,300 | "Licks" of flame in center. |
| 11 | 1,348 | Flames in center panel only. |
| 12 | 1,360 | Flames in center, small blue "licks" just over center panel. |
| 13 | 1,360 | Licks of flame from under the edge of center panel where the edges lifted slightly—the flames were not from the burning of surface. |
| 14 | 1,390 | "Licks" of blue flame just over edge of center panel. |
| 15 | 1,400 | No further change. |
| 16 | 1,410 | Do. |
| 17 | 1,415 | Do. |
| 18 | 1,420 | Do. |
| 19 | 1,440 | Do. |
| 20 | 1,460 | Do. |

In this test, there was no after-flame when the test flame was extinguished, and incandescense ceased six seconds after extinguishing the test flame. Throughout the test, no ashes or particles fell from the center panel, and the test was characterized by very little smoke. At no time during the twenty-minute test period did any flames approach the framing members holding the test panels. The only flames observed were not from the surface, but only along the edge of the center panel where a slight "lifting" or "buckling" of the surface, due to some delamination, was noted. Throughout the test, intumescence of the coating was observed.

As these tests indicate, the coating composition is preferably applied with two coats rather than one, but is effective when applied at a rate of application of the nitrogen-phosphorous complex of as little as 0.005, preferably at least 0.01 pound per square foot of protected substrate.

It will be apparent to those skilled in the art that various additional modifications to this invention were possible in addition to those specifically set forth hereinabove, which still within the spirit and scope of the following claims.

What is claimed is:

1. The flame-proofing composition consisting of the essential intumescing components of (1) dicyandiamide and (2) a substantially neutral compound consisting of a nitrogen-phosphorous complex, resulting from heating a reaction product of $P_2O_5$ and anhydrous ammonia at a temperature of at least about 150° C. in the presence of excess anhydrous ammonia to produce a condensation reaction in which ammonia is lost by the heated product, said compound having an atomic ratio of nitrogen to phosphorous of less than 1½ to 1 and containing no water of constitution; wherein the ratio of the amount of said nitrogen-phosphorous complex to the amount of the dicyandiamide is within the range of from about 10:1 to 1:2.

2. The composition of claim 1, wherein said range is from about 3:1 to 1.25:1.

3. The composition of claim 2, wherein said ratio is 1.5:1.

4. The composition of claim 1 dispersed in a vehicle therefor.

5. An aqueous solution and dispersion of the composition of claim 1, containing from about 15 to about 50 parts by weight of said nitrogen-phosphoric complex per about 100 parts of water.

6. The solution of claim 5, wherein the amount of said complex is 25 to 35 parts by weight.

7. The solution of claim 6, wherein said amount of said complex is 28 parts per weight, and the ratio of said complex to dicyandiamide is 1.5:1.

8. An aqueous solution and dispersion of the composition of claim 1, wherein there is also present a thickening agent.

9. The solution of claim 8, wherein the amount of said thickening agent is from about ½ to about 5 parts by weight per 100 parts of water.

10. The solution of claim 9, wherein said amount of thickening agent is from about 1 to 2.5 parts by weight.

11. The solution of claim 8, modified for applying thick coats thereof, wherein said thickening agent is present in an amount greater than 5 parts and up to about 10 parts by weight per 100 parts of water.

12. The solution of claim 8, wherein said thickening agent is present in an amount of 1⅓ parts by weight per 100 parts of water, and the ratio of said complex to dicyandiamide is 1.5:1, said complex being present in an amount of 28 parts by weight per 100 parts of water.

13. An aqueous solution and dispersion of the composition of claim 1, also containing a pigment dispersed therein.

14. The dispersion of claim 13, wherein said pigment is titanium dioxide.

15. An aqueous solution and dispersion of the composition of claim 1, wherein said water also contains from about 1 to about 4 parts of glycerine.

16. An aqueous solution and dispersion of the composition of claim 1, wherein said water also contains a surface active amount of a wetting agent.

17. A fibrous wood article protected against damage by fire and flame temperatures by a coating consisting essentially of the composition of claim 1.

18. A metal structural member protected against fire and flame temperatures, and insulated against heat deformation when exposed to the same, by a coating consisting essentially of the composition of claim 1.

References Cited in the file of this patent

UNITED STATES PATENTS

| | | |
|---|---|---|
| 2,600,455 | Wilson et al. | June 17, 1952 |
| 2,917,408 | Goldstein et al. | Dec. 15, 1959 |
| 2,935,471 | Aarons et al. | May 3, 1960 |